Nov. 2, 1948.        A. COX        2,452,909
THREE COMPONENT TELEPHOTO TYPE OPTICAL OBJECTIVE
Filed April 18, 1946
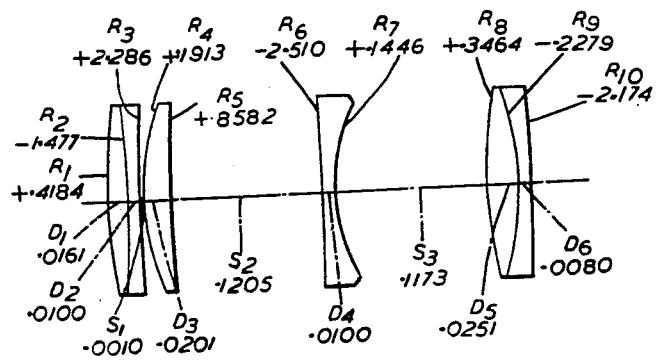
Inventor
*Arthur Cox*
By *Emery, Holcombe & Blair*
                *Attorneys*

Patented Nov. 2, 1948

2,452,909

UNITED STATES PATENT OFFICE 2,452,909

THREE-COMPONENT TELEPHOTO TYPE OPTICAL OBJECTIVE

Arthur Cox, Leicester, England, assignor to Taylor, Taylor & Hobson Limited, Leicester, England, a company of Great Britain Application April 18, 1946, Serial No. 663,088
In Great Britain March 13, 1946

12 Claims. (Cl. 88—57)

This invention relates to an optical objective of the type comprising a divergent member located between and spaced from two convergent members. This well-known type of objective has been modified in many ways for a variety of purposes, and the present invention is concerned particularly with one modification in which the divergent member is in the form of a simple element and the rear convergent member is in the form of a doublet consisting of a biconvex convergent element cemented in front of a meniscus divergent element, whilst the front convergent member has two convergent components separated by a small air space, one of such components consisting of a simple element and the other of a cemented doublet, the overall axial length from the front surface of the front member to the rear focal plane being less than the equivalent focal length of the objective so that the objective has the characteristics of a telephoto objective.

It should be made clear that the terms "front" and "rear" are herein employed, in accordance with usual convention, to relate to the sides of the objective respectively nearer to and further from the longer conjugate.

The present invention has for its object to provide an improved objective of the kind just mentioned, having short axial length between the front surface of the front member and the rear surface of the rear member and also short back focal length, and well corrected for oblique colour and distortion as well as for the other primary aberrations, so that the objective is suitable for use for instance as an aerial survey lens.

In the objective according to the present invention the simple component in the front member is located behind the doublet of such member and is axially separated from the divergent middle member by an air space not less than .09 and not greater than .15 times the equivalent focal length of the objective, the axial air separation between the divergent middle member and the convergent rear member being not less than half and not more than twice that between the divergent middle member and the convergent front member, and the divergent element of the rear member is made of a material having higher mean refractive index and higher Abbé V number than that of the associated convergent element, such two Abbé V numbers differing from one another by at least 10, the objective being corrected for spherical and chromatic aberrations, coma, astigmatism, field curvature and distortion. The Abbé V number of the material used for the convergent element in the convergent rear doublet should usually be not greater than 50, and that for the associated divergent element not less than 50.

The convergent front member preferably has an equivalent focal length not greater than half (and usually not less than a quarter) that of the whole objective. The doublet in such member conveniently consists of a biconvex element cemented in front of a biconcave element made of a material whose mean refractive index exceeds that of the material of the associated biconvex element by not less than .10 and not more than .30 and whose Abbé V number is lower than that of the material of the biconvex element. The cemented surface in such doublet may have a radius of curvature lying between .8 and 4.0 times the equivalent focal length of the objective. The radius of curvature of the front surface of the front doublet conveniently lies between .35 and .6 times such equivalent focal length.

The simple component of the convergent front member is preferably of meniscus form, with its rear surface concave to the rear and having radius of curvature not less than half and not more than twice the equivalent focal length of the objective.

The front surface of the divergent middle member preferably has a radius of curvature not less than 10 times and not more than 30 times that of the rear surface of the member.

The accompanying drawing shows one convenient practical example of objective according to the invention, and numerical data for this example are given in the following table, in which $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1, S_2, S_3$ represent the axial air separations between the components. The tables also give the mean refractive indices for the D-line and the Abbé V numbers of the materials used for the various elements.

| Equivalent focal length 1.000 | | Relative Aperture F/6.3 | |
|---|---|---|---|
| Radius | Thickness or Air Separation | Refractive Index $n_D$ | Abbé V Number |
| $R_1 + .4184$ | | | |
| | $D_1 .0161$ | 1.518 | 60.3 |
| $R_2 -1.477$ | | | |
| | $D_2 .0100$ | 1.699 | 30.5 |
| $R_3 +2.286$ | | | |
| | $S_1 .0010$ | | |
| $R_4 + .1913$ | | | |
| | $D_3 .0201$ | 1.518 | 60.3 |
| $R_5 + .8582$ | | | |
| | $S_2 .1205$ | | |
| $R_6 -2.510$ | | | |
| | $D_4 .0100$ | 1.699 | 30.5 |
| $R_7 +.1446$ | | | |
| | $S_3 .1173$ | | |
| $R_8 + .3464$ | | | |
| | $D_5 .0251$ | 1.579 | 40.4 |
| $R_9 - .2279$ | | | |
| | $D_6 .0080$ | 1.623 | 60.3 |
| $R_{10} -2.174$ | | | |

In this example the back focal length is .547 times the equivalent focal length of the objective. The focal length of the doublet and the simple convergent component, together constituting the convergent front member, is .344 times such equivalent focal length. The difference between the mean refractive indices of the materials used for two elements of the front doublet amounts to .181. The ratio between the radii of curvature $R_6$ and $R_7$ of the two surfaces of the divergent middle member is approximately 17.4. The ratio between the axial air separations $S_3$ and $S_2$ is .97.

What I claim as my invention and declare to secure by Letters Patent is:

1. An optical objective corrected for spherical and chromatic aberrations, coma, astigmatism, field curvature and distortion, and comprising a simple divergent member, a front convergent member consisting of a cemented convergent doublet disposed in front of and slightly separated from a simple convergent component whose rear surface is axially separated from the front surface of the divergent member by an air space lying between .09 and .15 times the equivalent focal length of the objective, and a rear convergent member in the form of a doublet having a biconvex convergent element cemented in front of a meniscus divergent element made of a material having mean refractive index higher than and Abbé V number at least 10 higher than those of the material of the associated convergent element, the axial air separation between the divergent middle member and the convergent rear member being not less than half and not more than twice that between the divergent middle member and the convergent front member, the overall length from the front surface of the front member to the rear focal plane being less than the equivalent focal length of the objective.

2. An optical objective as claimed in claim 1, in which the equivalent focal length of the convergent front member is not greater than half and not less than a quarter of the equivalent focal length of the whole objective.

3. An optical objective as claimed in claim 1, in which the simple component of the convergent front member is of meniscus form with its rear surface concave to the rear and having radius of curvature not less than half and not more than twice the equivalent focal length of the objective.

4. An optical objective as claimed in claim 1, in which the simple component of the convergent front member is of meniscus form with its rear surface concave to the rear and having radius of curvature not less than half and not more than twice the equivalent focal length of the objective, the equivalent focal length of the convergent front member being not greater than half and not less than a quarter of that of the whole objective.

5. An optical objective as claimed in claim 1, in which the front surface of the divergent middle member has a radius of curvature not less than 10 times and not more than 30 times that of the rear surface of the member.

6. An optical objective as claimed in claim 1, in which the front surface of the divergent middle member has a radius of curvature not less than 10 times and not more than 30 times that of the rear surface of the member, the equivalent focal length of the convergent front member being not greater than half and not less than a quarter of that of the whole objective.

7. An optical objective as claimed in claim 1, in which the simple component of the convergent front member is of meniscus form with its rear surface concave to the rear and having radius of curvature not less than half and not more than twice the equivalent focal length of the objective, the front surface of the divergent middle member having a radius of curvature not less than 10 times and not more than 30 times that of the rear surface of such member.

8. An optical objective corrected for spherical and chromatic aberrations, coma, astigmatism, field curvature and distortion, and comprising a simple divergent member, a front convergent member consisting of a cemented convergent doublet disposed in front of and slightly separated from a simple convergent component whose rear surface is axially separated from the front surface of the divergent member by an air space lying between .09 and .15 times the equivalent focal length of the objective, and a rear convergent member in the form of a doublet having a biconvex convergent element cemented in front of a meniscus divergent element made of a material having mean refractive index higher than and Abbé V number at least 10 higher than those of the material of the associated convergent element, the axial air separation between the divergent middle member and the convergent rear member being not less than half and not more than twice that between the divergent middle member and the convergent front member, the overall length from the front surface of the front member to the rear focal plane being less than the equivalent focal length of the objective, the doublet of the convergent front member consisting of a biconvex element cemented in front of a biconcave element made of a material whose mean refractive index exceeds that of the material of the associated biconvex element by not less than .10 and not more than .30 and whose Abbé V number is lower than that of the material of the biconvex element.

9. An optical objective as claimed in claim 8, in which the equivalent focal length of the convergent front member is not greater than half and not less than a quarter of the equivalent focal length of the whole objective.

10. An optical objective as claimed in claim 8, in which the cemented surface in the doublet of the convergent front member has a radius of curvature lying between .8 and 4.0 times the equivalent focal length of the objective.

11. An optical objective as claimed in claim 8, in which the simple component of the convergent front member is of meniscus form with its rear surface concave to the rear and having radius of curvature not less than half and not more than twice the equivalent focal length of the objective.

12. An optical objective as claimed in claim 8, in which the front surface of the divergent middle member has a radius of curvature not less than 10 times and not more than 30 times that of the rear surface of the member.

ARTHUR COX.

REFERENCES CITED

The following references are of record in the file of this patent:

UNITED STATES PATENTS

| Number | Name | Date |
|---|---|---|
| 1,825,828 | Sonnefeld | Oct. 6, 1931 |
| 2,260,368 | Durand | Oct. 28, 1941 |

FOREIGN PATENTS

| Number | Country | Date |
|---|---|---|
| 299,983 | Great Britain | Nov. 8, 1928 |